US012624302B2

(12) United States Patent
Roshanpour et al.

(10) Patent No.: US 12,624,302 B2
(45) Date of Patent: May 12, 2026

(54) METHOD AND REACTOR FOR PROCESSING A GAS

(71) Applicant: RONDA HIGH TECH S.R.L., Zane' (IT)

(72) Inventors: Shahram Roshanpour, Vicenza (IT); Anton Danilenko, Kharkov (UA)

(73) Assignee: RONDA HIGH TECH S.R.L., Zane' (IT)

( * ) Notice: Subject to any disclaimer, the term of this patent is extended or adjusted under 35 U.S.C. 154(b) by 593 days.

(21) Appl. No.: 18/016,418

(22) PCT Filed: Jul. 19, 2021

(86) PCT No.: PCT/IB2021/056491

§ 371 (c)(1),
(2) Date: Jan. 16, 2023

(87) PCT Pub. No.: WO2022/013843

PCT Pub. Date: Jan. 20, 2022

(65) Prior Publication Data

US 2023/0272295 A1 Aug. 31, 2023

(30) Foreign Application Priority Data

Jul. 17, 2020 (IT) ........................ 102020000017434

(51) Int. Cl.
| | |
|---|---|
| *C10K 3/00* | (2006.01) |
| *B01J 12/00* | (2006.01) |
| *B01J 19/08* | (2006.01) |
| *B01J 19/12* | (2006.01) |
| *C10J 3/64* | (2006.01) |
| *C10J 3/84* | (2006.01) |
| *H05H 1/46* | (2006.01) |

(52) U.S. Cl.
CPC ............. *C10K 3/008* (2013.01); *B01J 12/002* (2013.01); *B01J 19/088* (2013.01); *B01J 19/126* (2013.01);
(Continued)

(58) Field of Classification Search
CPC .. C10K 3/008; H05H 1/4622; H05H 2245/10; B01J 12/002; B01J 19/088;
(Continued)

(56) References Cited

U.S. PATENT DOCUMENTS

| | | | |
|---|---|---|---|
| 11,358,869 B2 * | 6/2022 | Zeller | B01J 19/088 |
| 2003/0070912 A1 * | 4/2003 | Holzschuh | H05B 6/806 |
| | | | 422/186.04 |

(Continued)

FOREIGN PATENT DOCUMENTS

| | | | | |
|---|---|---|---|---|
| KR | 20120103018 A | 9/2012 | | |
| KR | 101336868 B1 * | 12/2013 | | C01B 3/34 |
| WO | WO-2016093492 A1 * | 6/2016 | | B01J 19/087 |

OTHER PUBLICATIONS

Sasujit ("Overview of tar reduction in biomass-derived producer gas using non-thermal plasma discharges", Maejo Int. J. Sci Technol. 2019, 13(01), 42-61) (Year: 2019).*

(Continued)

*Primary Examiner* — Matthew J Merkling
(74) *Attorney, Agent, or Firm* — Carmel Patent Agency; Robert Ballarini

(57) ABSTRACT

A plasma processing method for a gas includes: supplying a gas inside a cavity for plasma processing, supplying microwaves having a predetermined frequency and power in order to generate a plasma of the gas, and propagating the microwaves in the gas by a waveguide which communicates directly with the cavity so as to provide a plasma cracking processing operation for the gas inside the cavity.

18 Claims, 5 Drawing Sheets

(52) U.S. Cl.
　　CPC . *C10J 3/64* (2013.01); *C10J 3/84* (2013.01);
　　　　　 *H05H 1/4622* (2021.05); *B01J 2219/19*
　　　　　 (2013.01); *C10J 2300/0916* (2013.01); *C10J*
　　　　　 *2300/1603* (2013.01); *H05H 2245/10*
　　　　　　　　　　　　　　　　　　　　　　(2021.05)

(58) Field of Classification Search
　　CPC ........ B01J 19/126; B01J 2219/19; C10J 3/64;
　　　　　　　 C10J 3/84; C10J 2300/0916; C10J
　　　　　　　　　　　　　　　　　　　　2300/1603
　　See application file for complete search history.

(56)　　　　　　　　References Cited

U.S. PATENT DOCUMENTS

2014/0125215　A1 *　5/2014　Lee ......................... H05H 7/02
　　　　　　　　　　　　　　　　　　　　　　313/231.31

2022/0168702　A1 *　6/2022　Doucet ................... B01J 6/008

OTHER PUBLICATIONS

Machine translation of KR-101336868-B1 (Nov. 6, 2025) (Year: 2025).*
Machine Translation of WO-2016093492-A1 (Nov. 6, 2025) (Year: 2025).*
Jamróz P. et al.: "Microwave plasma application in decomposition and steam reforming of model tar compounds", Fuel Processing Technology, vol. 169, pp. 1-14, Sep. 19, 2017.
Eliott Rodrigo Monteiro et al.: "Tar Reforming under Microwave Plasma Torch", Energy & Fuels, vol. 27, No. 2, pp. 1174-1181, Feb. 21, 2013.
Clarke R. N. et al: Review Article; Fabry-Perot and open resonators at microwave and millimetre wave frequencies, 2—300 GHz, Journal of Physics E. Scientific Instruments, IOP Publishing, Bristol, GB, vol. 15, No. 1, Jan. 1, 1982, pp. 9-24.

* cited by examiner

100

100

METHOD AND REACTOR FOR PROCESSING A GAS

FIELD OF THE INVENTION

The invention relates to a method, a reactor and an installation for processing a gas of the type suitable for example, for cracking a pyrolysis gas from the thermal destruction of biomass or refuse.

BACKGROUND

It is known to use the pyrolysis process for thermochemically decomposing biomass (that is to say, organic materials) by means of the application of heat (normally in the temperature range from 150 to 1000° C.) and substantially without any oxidizing agent (normally oxygen).

In practice, while heating the material in the presence of oxygen there is carried out a combustion which generates heat and which produces oxidized gaseous compounds, but by carrying out the same heating under conditions without oxygen, the material is subjected to the splitting of the original chemical bonds with simpler molecules being formed.

The products of pyrolysis are solid residues of coke, liquids and gas. In accordance with the parameters of the process, such as, for example, final temperature, pressure and presence of catalysts, the ratio of the components at the outlet in a different aggregation state may vary significantly.

There exist different types of pyrolysis which differ under process conditions and which are intended to obtain specific products.

Among the main pyrolytic processes carried out on a large scale, industrial cracking and thermal processing of refuse stand out.

It will be appreciated that the pyrolysis gas generated during the gasification of the biomass is currently considered to be an alternative source of energy gas which is economically advantageous with respect to natural gas for chemical synthesis and as a fuel for generating thermal energy. However, it must be observed that the direct use of the pyrolysis gas is complicated by the presence of aromatic substances in the composition thereof. To this end, the development of cracking processes for the pyrolysis gas which are effective and economically feasible is of particular importance.

Therefore, there is perceived the need for a system for processing pyrolysis gas which allows cracking of the pyrolysis gas and the dissociation of the tarry substances in order to convert the crude gas into an ecological fuel in an economic manner. Furthermore, there is perceived the need for a conversion system for the tarry substances into a gaseous state while maintaining the energy value of the gas.

Furthermore, not only the pyrolysis gas but also the exhaust gas generally contains tarry agents which must be destroyed so as to ensure that the emissions of the exhaust gas are safe for humans and for the environment.

There are known three main systems for removing the tarry substances from the gas.

The first system involves physical removal during the washing of the gas with solvents. In this system, the criterion of purity for the tarry substances remaining in the gas is the dew-point.

The second system is the destruction at high temperature. Generally, the tarry substances are subjected to cracking during the injection of oxygen. Disadvantageously, however, the destruction of the hydrocarbons is also brought about during the injection of oxygen.

The third system is the catalytic conversion of the tarry substances which is usually carried out using catalysts based on nickel for the crude gas immediately after the gas has been produced at high temperatures (from 400 to 900° C.). However, the main disadvantage of the prior art of the catalytic conversion systems for the pyrolysis gas for producing gaseous fuels is the high cost of the final product.

Various attempts have been made to solve the problem of providing an effective and ecological system for processing pyrolysis gas or exhaust gas. The problem has evident difficulties, furthermore as a result of the need to limit the energy costs and operating costs of the processing and to reduce the number of additional components which contribute to increasing the costs and the complexity of the system for processing the gas.

It may be noted that, in this context, the term "cracking" is intended to be understood to mean a chemical process for dissociating hydrocarbon compounds via which light hydrocarbons are obtained by splitting the heavy hydrocarbon molecules. It will be appreciated that the hydrocarbons comprise, for example, paraffinic, naphthenic or aromatic hydrocarbons.

It may further be noted that the term "tarry substances" (or tars) is intended to be understood to mean organic compounds having a high molecular mass and low level of oxidation, such as, for example, heavy molecules of paraffinic hydrocarbons.

Some examples of systems for processing a gas are described in Jamróz P. et al.: "Microwave plasma application in decomposition and steam reforming of model tar compounds", FUEL PROCESSING TECHNOLOGY, vol. 169, pages 1-14, 19 Sep. 2017, or in Eliott Rodrigo Monteiro et al.: "Tar Reforming under Microwave Plasma Torch", ENERGY & FUELS, vol. 27, no. 2, pages 1174-1181, 21 Feb. 2013, or in KR20120103018 or WO2016/093492.

SUMMARY

The technical problem addressed by the present invention is to provide a method, a plasma-chemical reactor and an installation which comprises such a reactor which are structurally and functionally configured to at least partially overcome one or more of the disadvantages set out with reference to the cited prior art.

This problem is solved by the invention by means of a method, a plasma-chemical reactor and an installation constructed according to one or more of the features of the appended claims.

According to an aspect of the invention, this problem is solved by a plasma processing method of a gas. Preferably, the gas comprises a pyrolysis gas.

It may be noted that, in this context, the term "plasma" is preferably intended to be understood to mean an ionized gas which is constituted by a group of electrons and ions and which is generally neutral (the total electrical charge of which is therefore zero). As such, the plasma is considered to be the fourth state of matter.

According to the invention the plasma processing method of the gas comprises supplying the gas inside a cavity for plasma processing, supplying microwaves having a predetermined frequency and power in order to generate a plasma of the gas, and propagating the microwaves in the gas preferably by means of a waveguide which communicates directly with the cavity so as to provide a plasma cracking processing operation for the gas inside the cavity. It will be appreciated that, in one aspect, the microwaves are propagated by the waveguide to the cavity via the gas without encountering any obstacle.

It may be noted that, in this context, the term "microwaves" is intended to be understood to mean electromagnetic waves with a wavelength (frequency) which is preferably between 1 mm (300 GHz) and 1 m (300 MHz).

It may further be noted that the term "waveguide" is intended to be understood to mean a transmission means for electromagnetic waves preferably having a linear structure which conveys and where applicable confines the electromagnetic waves inside a path between two ends of the linear structure, thereby allowing a guided propagation of the electromagnetic waves through the linear structure.

Advantageously, the gas supplies the generation of the plasma inside the processing cavity without adding an additional gas which is intended to sustain the generation of the plasma inside the cavity. In this manner, the technological process is more efficient and the equipment required is simplified.

According to another advantageous aspect, there is provision for accelerating the chemical reactions of the plasma cracking in the processing cavity by using the catalytic properties of the plasma. In this manner, the chemical reactions are accelerated without an additional expenditure of energy.

In one aspect, there is further provision for conveying the microwaves and the gas inside an electromagnetic resonator through the processing cavity. Under these conditions, the electromagnetic resonator is configured to concentrate the microwaves so as to generate a plasma of the gas inside the electromagnetic resonator.

More particularly, there is provision for the gas and the microwaves being discharged from the waveguide to be received in a processing pipe and preferably conveyed inside the electromagnetic resonator in order to concentrate the microwaves in the electromagnetic resonator so as to generate a plasma of the gas inside the electromagnetic resonator. This provision allows the plasma to reach in a rapid and safe manner the temperature required for processing the gas and more particularly for the relevant cracking. In fact, as a result of the electromagnetic resonator, it is possible to destroy the dangerous molecules (long and/or aromatic and/or toxic molecules) and to convert them into useful molecules, without thereby affecting the useful molecules already present in the gas in order to produce a synthesis gas.

It may be noted that it is preferable to receive the gas and the microwaves in the electromagnetic resonator only after the gas and the microwaves have left the waveguide or, in other words, have exceeded it.

In some embodiments, therefore, the electromagnetic resonator is arranged along the processing pipe preferably downstream of the waveguide in relation to a direction of flow of the gas and propagation of the microwaves by the waveguide towards the processing pipe.

It is further preferable for the electromagnetic resonator to be spaced apart from the waveguide along the processing pipe.

Preferably, the gas according to the invention is a gaseous admixture of hydrocarbons. It will be appreciated that the plasma/chemical method presupposes the integrated use of electrical and magnetic fields in order to produce the thermochemical interaction of the reagents.

The gas may be a pyrolysis gas which is supplied by a thermal destruction process (for example, a pyrolysis and/or gasification process) of a biomass or organic refuse. Following the pyrolysis and/or gasification step, the cracking step for the pyrolysis gas is carried out in a plasma chemical reactor. It must be observed that the cracking in the plasma chemical reactor is carried out at high temperatures which may reach, for example, 6000 K for the temperature of the plasma. In this manner, it is possible to obtain the virtually complete decomposition of tarry substances and water.

It must be observed that, in an aspect, the present invention relates to a plasma-chemical reactor for processing a gas with plasma. Advantageously, the plasma-chemical reactor allows the plasma processing method for a gas according to the invention to be carried out.

There is provided in the reactor a plasma processing cavity which is configured to receive the gas inside the cavity.

There is further provided an electromagnetic wave source which is configured to supply microwaves having a predetermined frequency and power in order to generate a plasma of the gas inside the cavity.

In an aspect, the plasma induced by microwaves is created and maintained using an electromagnetic energy source with an operating frequency between 300 MHz and 4 GHZ, preferably without any electrodes, thereby limiting the contamination of gas. Preferably, the operating frequency of the electromagnetic wave source is between 915 MHz and 2.45 GHz. Even more preferably, the operating frequency substantially comprises 915 MHz and/or 2.45 GHz.

Advantageously, the source has a wide range of operating power levels (from a few Watts up to approximately one thousand kilowatts), remaining below the high power required by the thermal torches, at pressures which can vary, for example, from $1 \times 10^{-2}$ Pa to 105 Pa.

According to another advantageous aspect, the reactor comprises a waveguide which communicates directly with the processing cavity. The waveguide is configured to receive the microwaves from the electromagnetic wave source and to propagate the microwaves in a guided manner in the cavity through the gas so as to advantageously provide a plasma cracking processing operation for the gas inside the cavity.

It must be observed that, in an aspect, the internal volume with respect to the processing cavity and the waveguide does not have discontinuities. In other words, it is preferable to remove any physical separation element between the waveguide and the processing cavity so that the waveguide is in fluid communication with the processing cavity. In this manner, the microwaves can directly strike the gas, promoting the reaching of temperatures suitable for processing the plasma of the gas.

In a preferred example, the waveguide is developed in a main direction for emission of the microwaves, also referred to below as the first axis, and the cross-section with respect to this main direction preferably remains constant. Advantageously, the area and/or the form of the cross-section remain constant. According to another respect, the plasma processing cavity comprises an inlet pipe which is configured to convey the gas towards the waveguide and, preferably, a processing pipe which is configured to receive the gas and the microwaves from the waveguide so as to provide the plasma cracking processing operation for the gas inside the processing pipe.

Advantageously, the waveguide allows the electromagnetic field to be confined via the "reflection" on the walls of the waveguide. It will be appreciated that the waveguide may comprise a hollow linear structure which has, for example, a rectangular cross-section. It must be observed that, without the physical constraint of a waveguide, the wave magnitudes decrease according to the inverse square law while they expand in three-dimensional space. In this context, the waveguide is a structure which guides the microwaves, with a minimal loss of energy limiting the transmission of energy preferably in a single direction.

In an aspect, there is further provided an electromagnetic resonator along the plasma processing pipe. It will be appreciated that the electromagnetic resonator is configured to receive the gas and the microwaves along the processing pipe and to concentrate the microwaves inside the electromagnetic resonator so as to generate a plasma of the gas passing through the electromagnetic resonator.

In some embodiments, the electromagnetic resonator is in the form of a widening of the processing pipe and, more particularly, is in the form of a radial expansion along the longitudinal extent of the processing pipe. This form allows the quantity of energy of the microwaves which is absorbed by the gas to be maximized.

The dimensions of the electromagnetic resonator, for example, the diameter or the longitudinal extent thereof along the processing pipe, can be determined as a function of process parameters, such as the concentration, quantity and pressure of the gas, the frequency and the power of the microwaves, etc.

Once determined, the dimensions of the electromagnetic resonator are preferably fixed and non-variable. In some embodiments, therefore, it is impossible to vary the dimensions of the electromagnetic resonator via movable means, such as a movable piston.

In preferred embodiments, the waveguide and/or the processing cavity and/or the processing pipe and/or the electromagnetic resonator are produced from metal, preferably stainless steel.

In this manner, the invention provides a plasma processing system for cracking the gas. The results of research carried out by the Applicant show that this plasma system allows the gas to be processed, significantly reducing the energy costs and the operational costs for the dissociation of the tarry substances.

It must be observed that the present invention ensures a powerful ionization of the gas as a result of an efficient microwave connection which allows a high temperature to be reached at the center of the plasma and, furthermore, without heating the entire volume of gas, unlike what happens during heating by means of a resistor which is therefore disadvantageous in terms of energy with respect to the plasma induced by microwaves. Unlike the heating by means of a resistor, which is commonly used to heat the gases in contact with hot surfaces, the heating in the microwave plasma reactor depends on the distribution of the electromagnetic fields which are located inside the plasma and which lead to the ionization of the plasma. Under these conditions, the temperature in the microwave plasma may reach from 2000 to 6000 K.

In an aspect, the invention relates to an installation for pyrolysis and/or gasification of biomass, comprising a pyrolizer and/or gasifier which is configured to supply a pyrolysis gas which is generated by the pyrolysis and/or gasification of the biomass and furthermore the plasma chemical reactor. In this installation, the reactor is configured to receive the pyrolysis gas and to provide a plasma cracking processing operation for the pyrolysis gas. In this manner, the installation advantageously allows an economical conversion of the crude gas into an ecological fuel.

It will be appreciated that the use of the microwave plasma technology for processing the pyrolysis gas allows the tarry substances to be eliminated and simple hydrocarbon compounds to be obtained without generating additional waste and while respecting the environment. Furthermore, the hydrogen produced by the cracking can be considered to be another valuable product for industry.

Furthermore, the plasma-chemical cracking of the tarry substances may further increase the energy value of the gas and prevent the blocking and corrosion of the tubes. Furthermore, the plasma-chemical cracking of the tarry substances prevents damage to the elements of the technological equipment.

It will be appreciated that, in some embodiments, the gas comprises an exhaust gas, such as, for example, the exhaust gas of an internal combustion engine. In this context, the invention may be used for destroying tarry agents in the exhaust gas. The invention thereby provides a method and a plasma cracking reactor as a result of microwaves for processing the exhaust gas of industrial installations and/or motor vehicles provided with internal combustion engines, such as, for example, a diesel motor.

BRIEF DESCRIPTION OF THE DRAWINGS

The features and advantages of the invention will be better appreciated from the following detailed description of a preferred though non-limiting embodiment thereof which is illustrated by way of non-limiting example with reference to the appended drawings, in which.

DETAILED DESCRIPTION OF THE PREFERRED EMBODIMENTS

In the Figures, there are generally designated 1 and 100 a chemical reactor for processing plasma of a gas and an installation for pyrolysis and/or gasification of biomass comprising the reactor 1, respectively.

It will be appreciated that, preferably, the gas is an admixture of gases and, even more preferably, comprises a pyrolysis gas. Advantageously, the plasma processing of the gas comprises a cracking processing of the gas.

The reactor 1 comprises a cavity 2 for plasma processing which is configured to receive the gas inside the cavity 2. It will be appreciated that the cavity 2 is preferably confined inside a tube which is suitable for withstanding high temperatures, such as the temperatures of a plasma torch.

There is further provided an electromagnetic wave source (not shown) which is configured to supply microwaves having a predetermined frequency and power in order to generates a plasma of the gas inside the cavity 2. It will be appreciated that the density of the electrons is higher in the microwave plasma with respect to other types of plasma, such as, for example, in the radiofrequency plasma (RF) or direct current plasma (DC).

It must be observed that the source of electromagnetic waves may include a power supply, a magnetron and preferably a circulator in order to protect the magnetron from the reflected power.

There is further provided in the reactor 1 a waveguide 6 which communicates directly with the cavity 2. In other words, the internal volume defined by the waveguide 6 is advantageously in communication with the internal volume defined by the cavity 2, preferably without any physical separation elements. The waveguide 6 is configured to receive the microwaves from the electromagnetic wave source and to propagate in a guided manner the microwaves in the cavity 2 through the gas so as to provide the plasma cracking processing for the gas inside the cavity 2.

Figure 4:
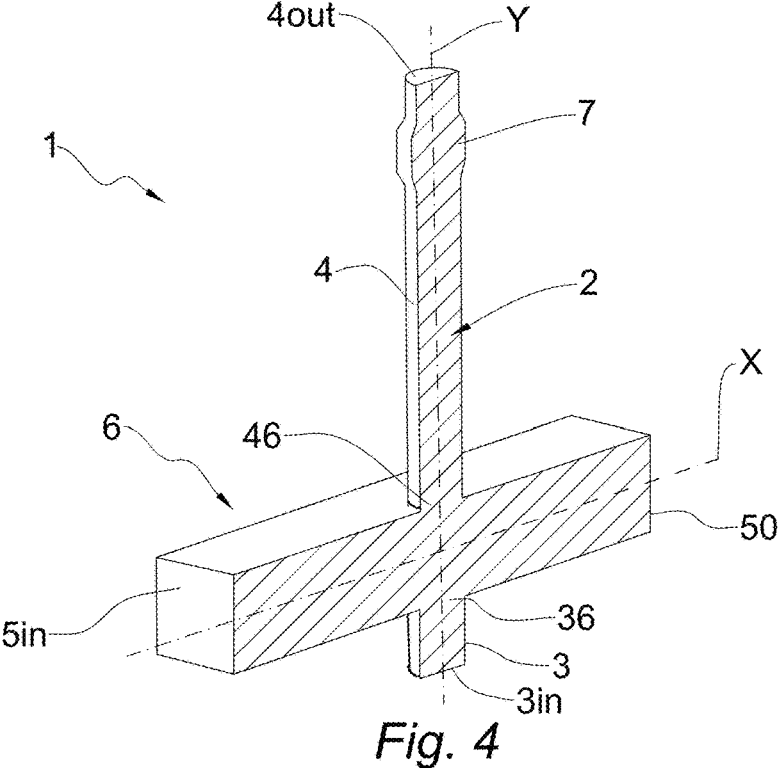
FIG. 4 is a perspective cross-section along the line IV-IV of the reactor of FIG. 3.

In an aspect, as set out in FIG. 4, the internal volume with respect to the cavity 2 and the waveguide 6 does not have any discontinuities. In this manner, there can be generated a common intersection zone between the two volumes in which the gas is directly struck by the microwaves.

According to another advantageous aspect, the cavity 2 has an inlet pipe 3 which is configured to convey the gas towards the waveguide 6 and a processing pipe 4 which is configured to receive the gas and the microwaves from the waveguide 6 so as to provide the plasma cracking processing for the gas inside the processing pipe 4.

In preferred embodiments, the waveguide 6 has a hollow linear structure which extends along a first axis X from a first end 5 in towards a second end 50. In an aspect, the first end 5 in is directed towards the electromagnetic wave source. Advantageously, the first end 5 in is closed with a material which is transparent to electromagnetic waves emitted by the source so as to receive the electromagnetic waves emitted by the source. According to another advantageous aspect, the first end 5 in is closed with glass and/or quartz.

Preferably, the electromagnetic wave source is located at or adjacent to the first end 5 in of the waveguide 6. However, the second end 50 is directed at the opposite side to the source. Preferably, the second end 50 is closed and is not transparent to the electromagnetic waves which are propagated inside the waveguide 6.

It will be appreciated that, preferably, the inlet pipe 3 is engaged in the waveguide 6 at a first section 36 and communicates directly with the waveguide 6 through the first section 36, as set out in FIG. 4. Similarly, the processing pipe 4 is engaged in the waveguide 6 at a second section 46 and communicates directly with the waveguide 6 through the second section 46.

Figure 7:
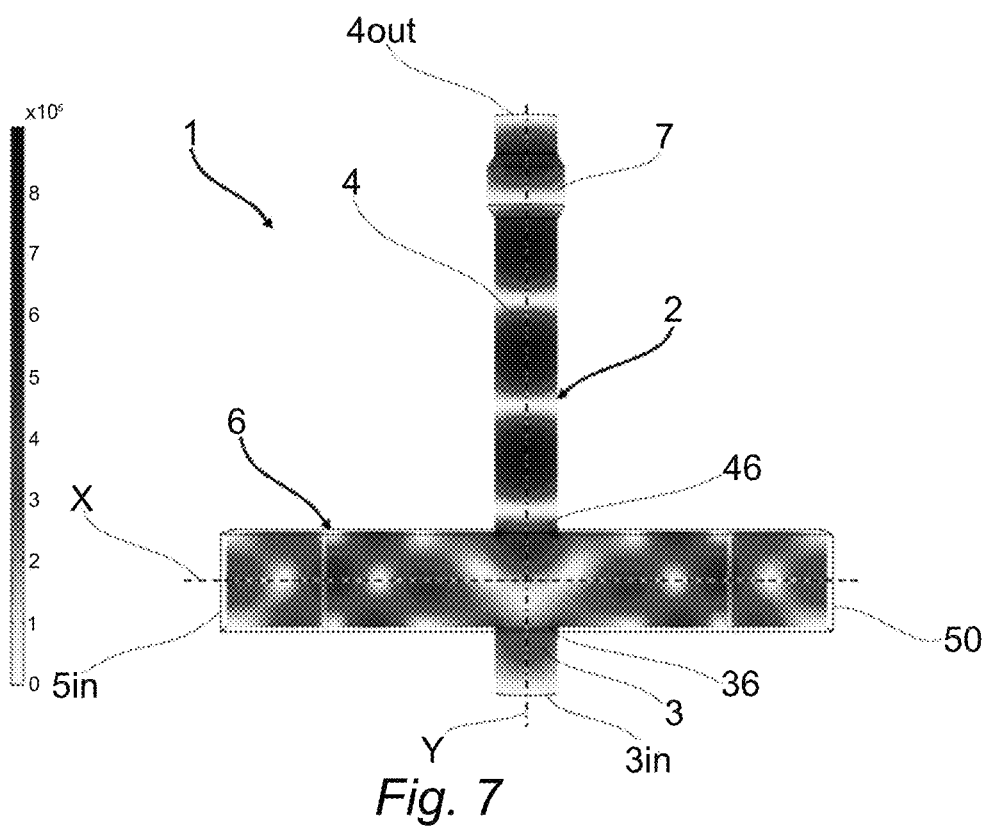
FIGS. 7 and 8 are a front view and a perspective view of a distribution model of the standard of the electrical field (V/m) inside the reactor of FIG. 1 according to a numerical simulation, respectively.
Figure 8:
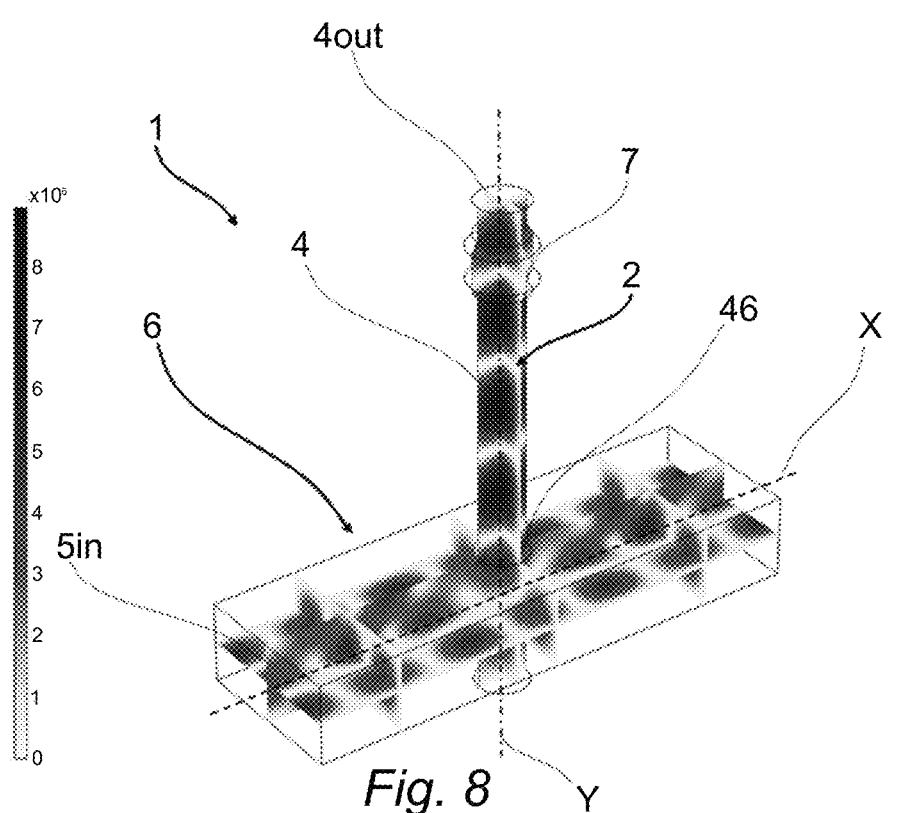

In this context, the waveguide 6 is configured to convey the microwaves from the source towards the cavity 2, preferably through the first section 36 and/or the second section 46, as shown in FIGS. 7 and 8 according to a numerical simulation of the electrical field inside the reactor. The cavity 2 is in turn configured to receive the microwaves from the waveguide 6 and to convey the microwaves through the gas inside the cavity 2.

It must be observed that, in an aspect, the microwaves are propagated by the waveguide 6 to the cavity 2 through the gas without encountering any obstacle.

Advantageously, the microwaves are transmitted inside the waveguide 6 and the cavity 2 so that the energy is transmitted to the electrons of the gas which supplies the plasma.

Under these conditions, the electromagnetic field accelerates the electrons. During the collisions with the heavy particles, the movement energy of the electrons is converted into heat. If the collisions are frequent enough, the distribution of the velocities of the electrons is virtually isotropic and the characteristics of the excitation and ionization processes can be calculated using the Maxwell distribution function for the velocities of the electrons, disregarding the directional velocity (velocity of the flux of mass).

According to another advantageous aspect, the inlet pipe 3 at the opposite side to the waveguide 6 comprises an inlet opening 3in. Similarly, the processing pipe 4 at the opposite side to the waveguide 6 comprises an outlet opening 4out.

In this context, the cavity 2 is configured to generate a plasma jet, that is to say, a plasma torch, through the processing pipe 4. It must be observed that the plasma is generated directly in the gas (for example, pyrolysis gas) and, consequently, the molecules of gas are subjected to ionization. Advantageously, there is no provision for supplying an additional gas (for example, argon) other than the gas (for example, pyrolysis gas) for generating or sustaining the plasma. This gas supply system allows the efficiency of the process to be increased.

In preferred embodiments, the hollow linear structure of the waveguide 6 has a rectangular cross-section. It will be appreciated that the dimensions of the waveguide 6 and the operating frequency of the electromagnetic waves are selected to cause the electromagnetic waves to be propagated inside the waveguide 6 in the fundamental mode (that is to say, in the mode with the lowest critical frequency) which preferably corresponds to the transverse electrical mode $TE_{1,0}$.

In an aspect, the cavity 2 and/or the inlet pipe 3 and/or processing pipe 4 have a hollow linear structure which is developed along a second axis Y. It will be appreciated that the first axis X and the second axis Y are transverse relative to each other. Preferably, the first axis X and the second axis Y are perpendicular to each other. In an aspect, the hollow linear structure of the cavity 2 and/or the inlet pipe 3 and/or processing pipe 4 has/have a circular cross-section.

Figure 1:
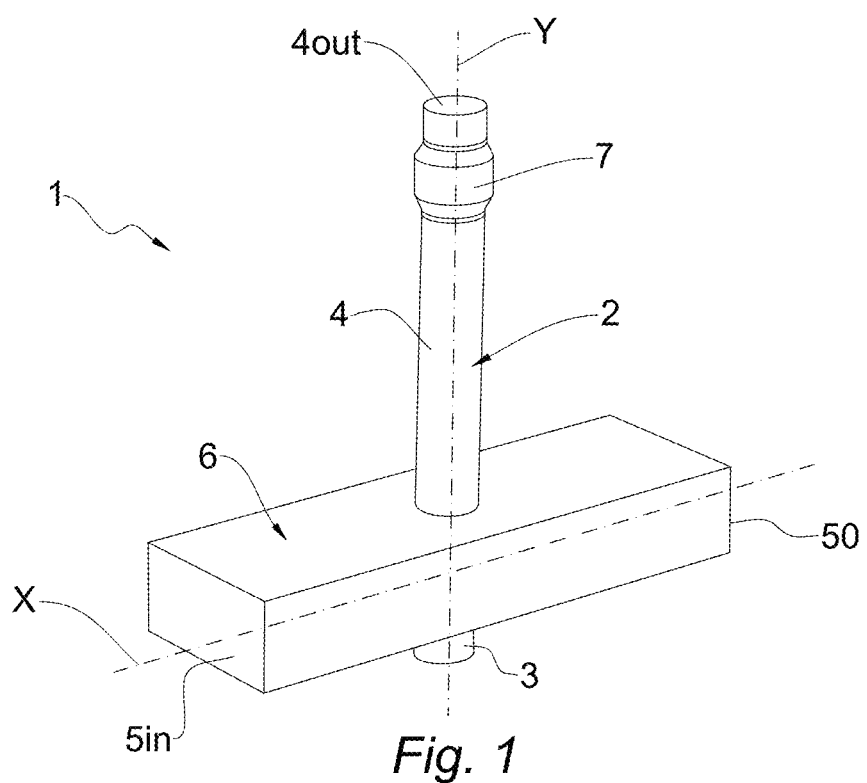
FIG. 1 is a perspective view of the plasma-chemical reactor according to the invention.
Figure 2:
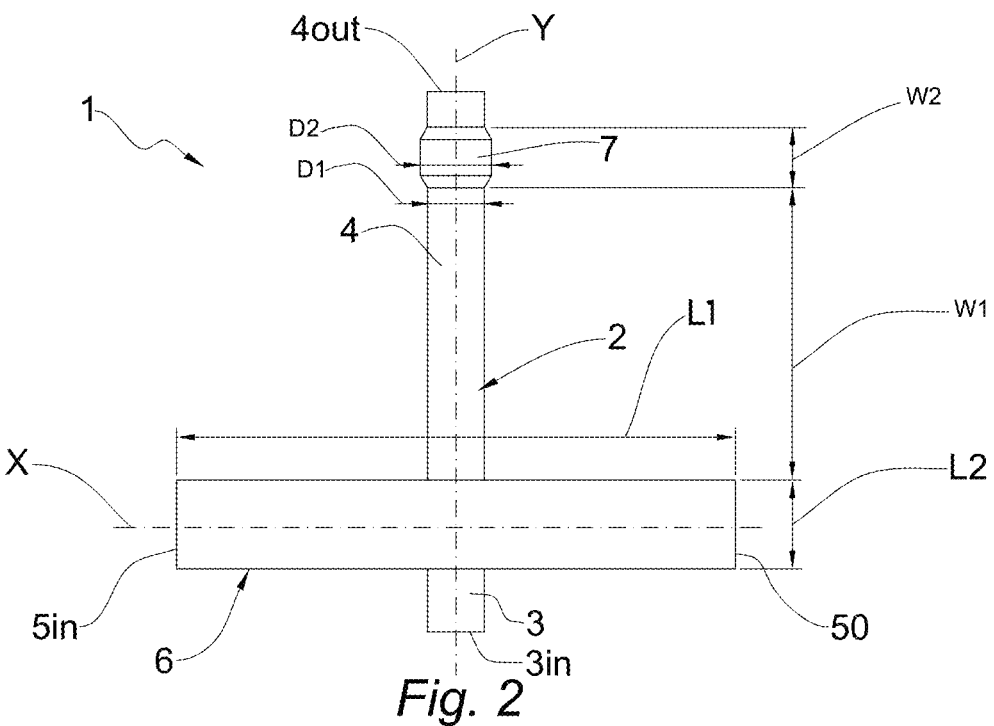
FIGS. 2 and 3 are a front view and a side view of the reactor of FIG. 1, respectively.
Figure 3:
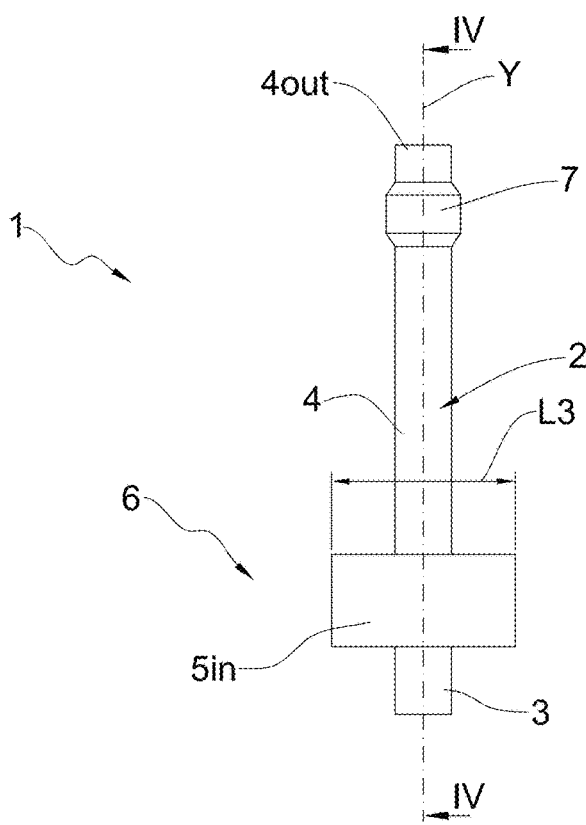

As shown in FIG. 2, the linear structure of the waveguide 6 may extend along the first axis X over a first length L1 and along the second axis Y over a second length L2. Furthermore, as shown in FIG. 3, the cross-section of the waveguide 6 may extend in a perpendicular direction relative to the plane defined by the first axis X and the second axis Y over a third length L3. It will be appreciated that the first length, second length and third length L1, L2, L3 depend on parameters such as, for example, the flow rate and the pressure of the gas in the reactor. In some embodiments by way of non-limiting example, the first length L1 (for example, 780 mm) is from three to ten times the second length L2 and preferably from six to seven times the second length L2 (for example, 124 mm) which may in turn be from one to two thirds of the third length L3 and preferably substantially half of the third length L3 (for example, 248 mm).

It must be observed that, advantageously, the inlet pipe 3 and processing pipe 4 of the cavity 2 are directly open in the internal volume of the waveguide 6 without any interruption of continuity between the internal volume of the waveguide 6 and the inlet pipe 3 and processing pipe 4.

In an aspect, the reactor 1 comprises an electromagnetic resonator 7 along the processing pipe 4. The electromagnetic resonator 7 is configured to receive the gas and the microwaves along the processing pipe 4 and to concentrate the microwaves inside the electromagnetic resonator 7 so as to generate a plasma of the gas passing through the electromagnetic resonator 7.

According to another advantageous aspect, the electromagnetic resonator 7 has a hollow cylindrical structure which is developed along the second axis Y of the processing pipe 4. Preferably, the hollow cylindrical structure has a cross-section which is greater than the cross-section of the processing pipe 4.

In a preferred example, it is possible to define a first diameter D1 of the processing pipe 4 and a second diameter D2 of the electromagnetic resonator 7. Preferably, the second diameter D2 is greater than the first diameter D1 and, in some embodiments, may be up to double the first diameter D1.

More generally, according to an aspect of the invention, the resonator 7 is in the form of a widening of the processing pipe 4 and/or the cavity 2.

In some embodiments, the electromagnetic resonator 7 is spaced apart from the waveguide 6 along the processing pipe 4 by a first distance W1 which is preferably greater than the first diameter D1. The first distance W1 is, for example, between two and ten times the first diameter D1 and, in a preferred example, is between four and seven times the first diameter D1.

Still in some embodiments, the electromagnetic resonator 7 extends along the longitudinal extent of the processing pipe 4 over a second distance W2 which is preferably less than the first distance W1. The first distance W1 is, for example, between two and ten times the second distance W2 and, in a preferred example, it is between four and eight times the second distance W2.

It is further preferable for the second distance W2 to be less than or approximately equal to the second diameter D2 of the resonator.

Figure 9:
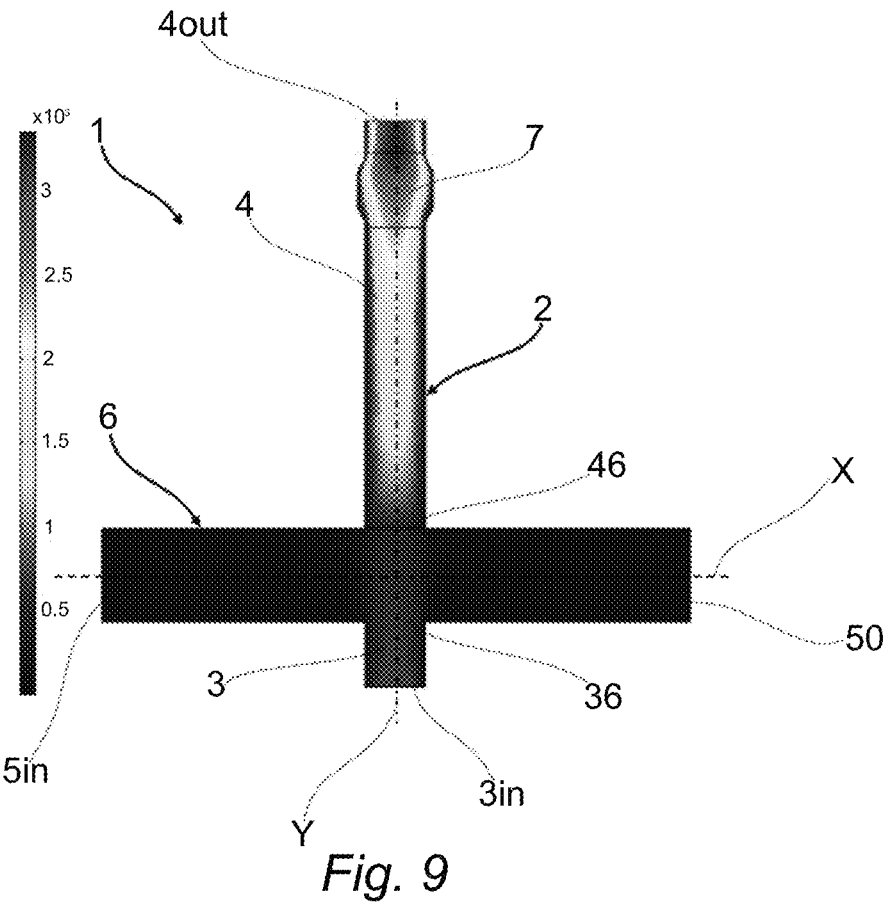
FIG. 9 illustrates a temperature profile (K) of the plasma inside the reactor of FIG. 1 according to a numerical simulation.

In this manner, when the microwaves being discharged from the waveguide 6 through the processing pipe 4 approach the electromagnetic resonator 7, the concentration thereof increases more and more, involving a localized increase of the temperature of the plasma at the center of the electromagnetic resonator 7 as shown by the temperature profile in FIG. 9 in accordance with a numerical simulation carried out by the Applicant.

It must be observed that, in the region of the electromagnetic resonator 7, the plasma reaches the maximum temperature which makes the plasma processing and the cracking possible via the reactor 1. In this manner, it is possible to destroy the dangerous molecules (long and/or aromatic and/or toxic molecules) and to convert them into useful molecules without further affecting the useful molecules already present in the gas so as to produce a synthesis gas.

Advantageously, the hollow cylindrical structure of the resonator 7 has an adjustable diameter as a function of process parameters, such as, for example, the concentration of the gas, the quantity and pressure of the gas, the frequency and power of the microwaves, and the like.

It must be observed that, when the gas is supplied directly to the plasma torch, all the gas passes through the region of high temperatures necessary for the chemical reactions of dissociation, while the temperature of the gas does not increase significantly. This allows a reduction in the consumption of energy for the processing of the gas while maintaining the efficiency thereof.

During operation of the reactor 1, the admixture of gas is introduced into the reactor from the inlet opening 3 in of the inlet pipe 3 at a given volumetric flow (for example, 0.05 $m^3/s$) and is discharged out of the reactor from the outlet opening 4out of the processing pipe 4. In an aspect, the inflow of gas in the inlet pipe 3 has a high temperature (for example, from 700 to 900° C.).

It will be appreciated that the speed of the gas increases as the gas flows through the cavity 2 from the inlet opening 3 in towards the outlet opening 4out, passing through inter alia the first section 36 and the second section 46. The increase of the speed results from the fact that the temperature increases further with greater proximity to the resonator 7.

Figure 10:
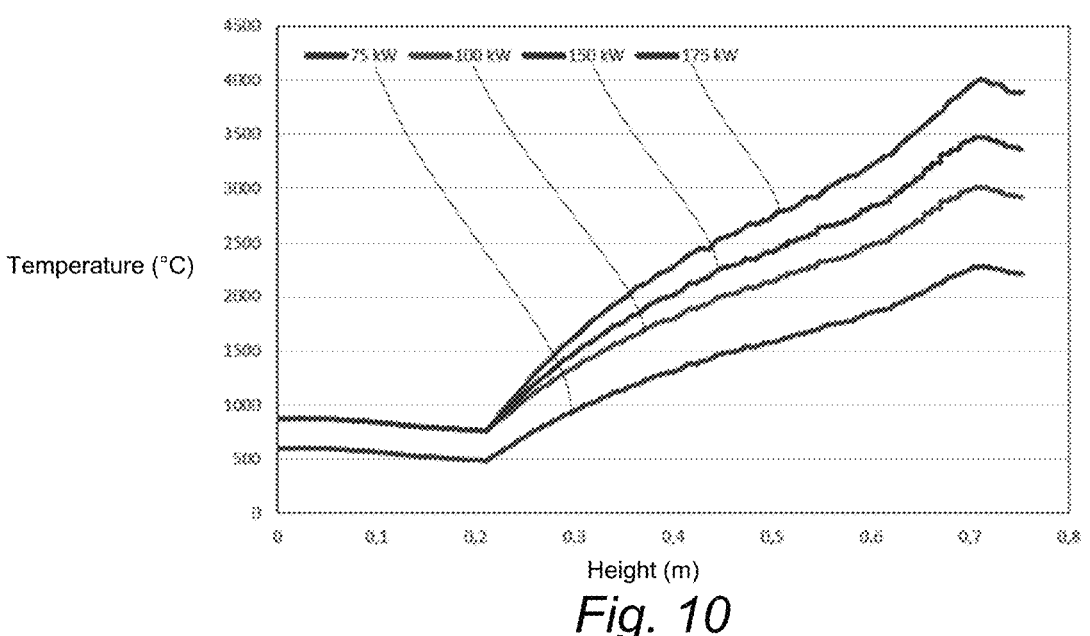
FIG. 10 illustrates the progression of the temperature (° C.) of the plasma along an axis of the reactor of FIG. 1 as a function of the power (KW) of the reactor itself according to a numerical simulation.

As shown by the temperature profile in the example of FIG. 9, the temperature of the plasma increases radially from the walls of the cavity 2 towards the second axis Y of the cavity 2. Furthermore, the temperature is greater when the electromagnetic waves approach the resonator 7, as shown in the example of FIG. 10 by the increasing progression of the temperature (° C.) at the center of the plasma along the axis of the processing pipe 4 from the inlet opening 3 in towards the resonator 7. As a result of the accumulation of electromagnetic waves, therefore, the maximum temperature is reached at the center of the resonator 7 and near the outlet opening 4out.

It will be appreciated that the maximum temperature depends inter alia on the operating power P of the reactor, as shown, for example, in FIG. 10 in relation to four power levels of the reactor equal to 75 kw, 100 KW, 150 KW or 175 kW. In an aspect, the operating power P of the reactor 1 may vary, for example, between 3 kW and 175 KW. The maximum temperatures at the center of the plasma (for example, between 200° and 6000° C. or preferably between 2500 and 400° C.) allow the thermal cracking and the plasma cracking of the gases introduced into the reactor 1.

It must be observed that, advantageously, the plasma induced by microwaves does not require a fixed pressure and is also stable at different pressure ranges. According to another advantageous aspect, the cracking of the gas may be brought about at low pressures (for example, from 10 to 80 mbar) or at atmospheric pressure. It will be appreciated that the pressure depends inter alia on the quantity of gas with which the reactor is supplied. Furthermore, the increase of the pressure during the cracking in the vapor phase advantageously reduces the volume of vapor, feedstock and cracking products and this allows an increase in the productivity of the installation or an increase in the length of time of the feedstock in the reaction zone. At the same time, the pressure significantly influences the composition of the cracking products because the pressure increases the rate of secondary reactions (such as polymerization and hydrogenation of unsaturated hydrocarbons, condensation of aromatic hydrocarbons, etc.), reducing the production of gas.

In an aspect, the gas admixture which is intended to be introduced into the reactor 1 comprises one or more components. In this context, the energy consumption for heating all the components of the gas in kJ is preferably calculated using the formula:

$$Q_{iH} = V_i c_i \Delta t_i$$

where $V_i$ is the volume in $m^3$ of each component of the gas; $C_i$ is the thermal capacity of each component in kJ/$(m^3 \times C)$ at the temperature of 1000° C.; and $\Delta t_i$ is the increase of the temperature of the gas in degrees Celsius (or Kelvin).

Furthermore, the energy consumption for the dissociation of the tarry substances in kJ is preferably calculated using the formula:

$$Q_{ip} = 1000 \frac{V_i(-\Delta H_i)}{22.4}$$

where $(-\Delta H_i)$ is the energy consumption for the dissociation of a substance, which is equal to the specific formation enthalpy of the substance itself taken with the opposite sign.

It is advantageously possible to obtain an additional reduction of the energy consumption using the catalytic properties of the plasma. In fact, it will be appreciated that the chemical reactions in the plasma take place more rapidly than in other means for the same temperature. Therefore, it is possible to reduce the temperature in order to obtain the same chemical reactions with a reduction of the energy consumption.

The experimental results obtained by the Applicant demonstrate that it is possible to obtain a conversion of substantially 100% of the tarry substances in the gas at the processing temperature of the gas of 100° C. at the outlet.

Figure 5:
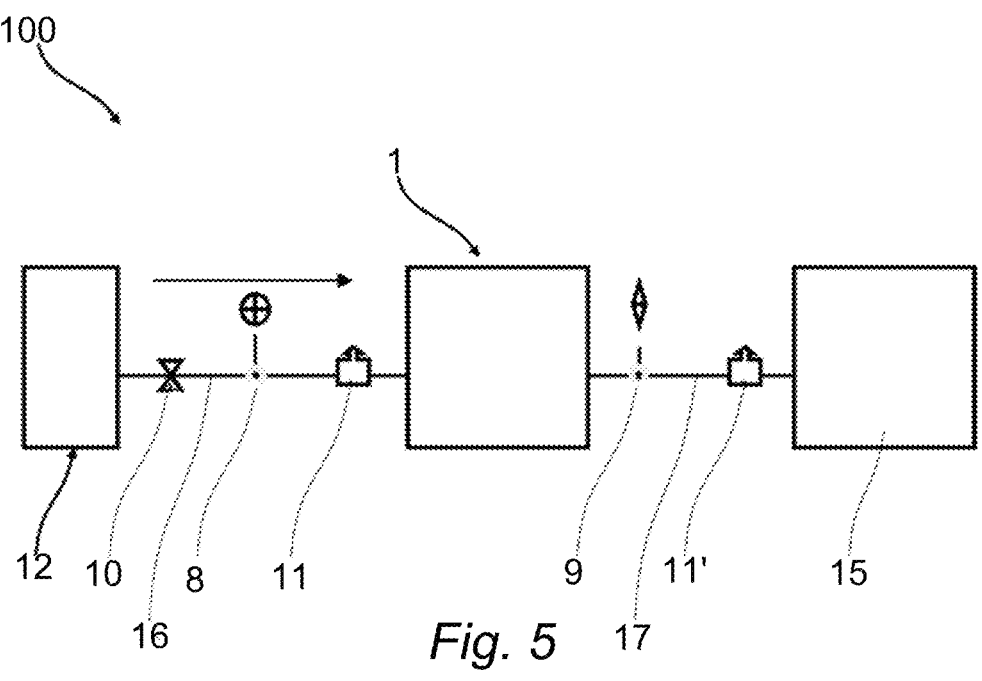
FIG. 5 is a connection diagram of the reactor according to the invention.
Figure 6:
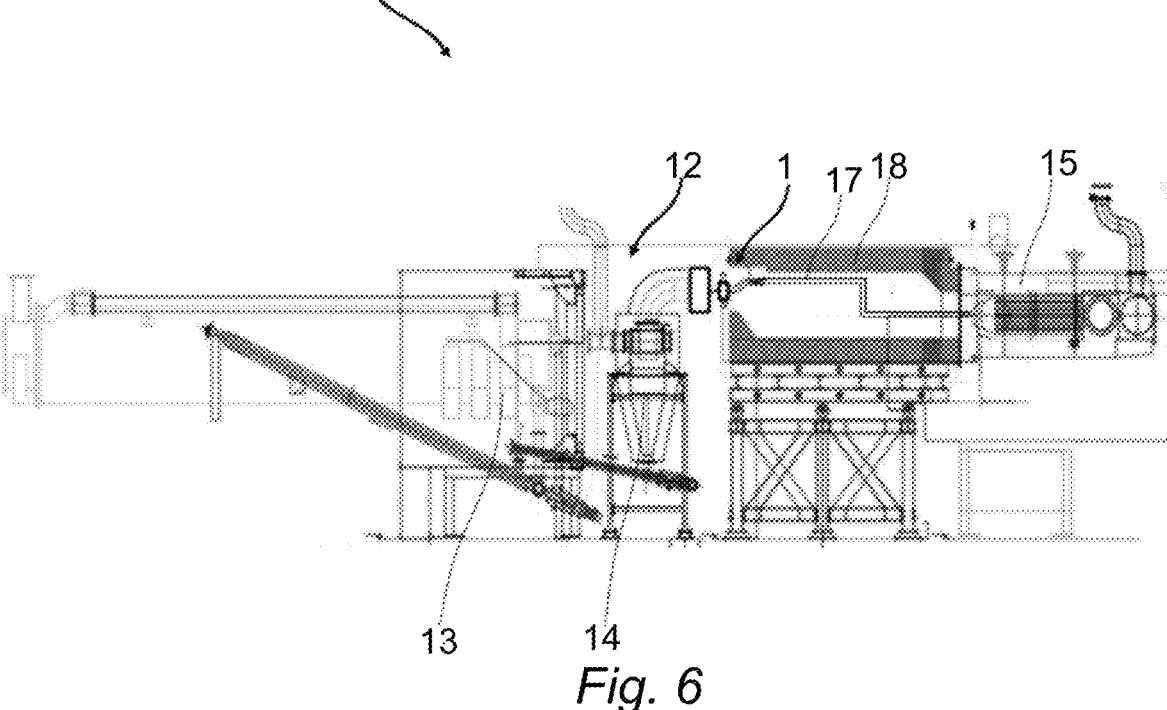
FIG. 6 is a diagram of an installation according to the invention.

In an aspect, the present invention relates to an installation 100 for the pyrolysis and/or gasification of biomass, as shown in FIG. 6. It will be appreciated that the installation 100 comprises a pyrolizer and/or gasifier 13 which is configured to supply a pyrolysis gas which is generated by the pyrolysis and/or gasification of the biomass and furthermore the reactor 1, which may be connected according to the diagram of FIG. 5. In this context, the reactor 1 is configured to receive a pyrolysis gas which is generated by the pyrolysis and/or gasification of the biomass and to provide a plasma cracking processing operation for the pyrolysis gas. It will be appreciated that the reactor 1 behaves in the manner of a microwave plasma filter which is configured to remove the tarry substances from the pyrolysis gas. The effective conversion of the tarry substances is promoted both by a high peak temperature in the plasma and by the high turbulence generated by the plasma.

The operation of the installation initially provides for a thermochemical degradation or decomposition step for the biomass without any or in the partial presence of oxygen. The degradation step comprises the pyrolysis and/or gasification of the biomass. This step generates a pyrolysis gas. Afterwards, there is provided a plasma processing step for cracking the pyrolysis gas. The step of plasma processing provides for supplying the pyrolysis gas inside the plasma processing cavity 2, supplying microwaves having a frequency and power which are predetermined to generate a plasma of the pyrolysis gas, and propagating the microwaves in the pyrolysis gas by means of the waveguide 6 so as to provide the plasma cracking processing of the pyrolysis gas inside the cavity 2 by splitting the heavy paraffinic hydrocarbon molecules.

In preferred embodiments, the installation 100 comprises a pyrolysis gas distributor 12 which supplies the inlet pipe 3 of the reactor 1 by providing pyrolysis gas. Preferably, the distributor 12 includes a pyrolizer or gasifier 13 and a cyclone 14. It will be appreciated that the pyrolizer or gasifier 13 is configured to supply the cyclone 14 which is in turn configured to supply the pyrolysis gas to the reactor 1.

In an aspect, the pyrolysis gas distributor 12 is operationally connected to the reactor 1 by means of a supply tubing 16 which is engaged in the inlet pipe 3.

Advantageously, there is provided in the installation 100 a flowmeter 8 which is configured to measure a flow rate of a flux of the gas being introduced towards the reactor 1. In an aspect, the flowmeter 8 is arranged in the region of the supply tubing 16.

There is preferably provided a discharge device 15 which is configured to receive the gas being discharged from the reactor 1. In an aspect, the discharge device 15 comprises cooling means which are configured to cool the gas being discharged from the reactor 1. It will be appreciated that the discharge device 15 is operationally connected to the reactor 1 by means of a discharge tubing 17 which is operationally connected to the outlet opening 4out of the processing pipe 4.

It will be appreciated that the reactor 1 can be installed in a pre-existing cracking installation by providing minimal modifications to the pre-existing installation, as shown in the example of FIG. 6. Advantageously, the reactor 1 may be mounted upstream of a pre-existing cracking chamber 18 of the installation. No longer being used for the plasma processing, the cracking chamber 18 can be used to provide the passage of the discharge tubing 17 through the cracking chamber 18 from the reactor 1 towards the discharge device 15.

According to another advantageous aspect, there is provided a temperature sensor 9 which is configured to measure a temperature of the gas being discharged from the reactor 1. In an aspect, the temperature sensor 9 is arranged in the region of the discharge tubing 17.

Preferably, the installation 100 further comprises at least one shut-off valve 10 which is configured to regulate or intercept a flow of the gas being introduced towards the reactor 1. It will be appreciated that the shut-off valve 10 is advantageously arranged in the region of the supply tubing 16, preferably upstream of the flowmeter 8.

Advantageously, there is further provided at least one collection valve 11 which is configured to collect a portion of the gas being introduced into the reactor 1 or being discharged from the reactor 1. In some preferred embodiments, there are provided a collection valve 11 which is configured to collect a portion of the gas in the region of the supply tubing 16 (preferably downstream of the flowmeter 8) and an additional collection valve 11' which is configured to collect a portion of the gas in the region of the discharge tubing 17 (preferably downstream of the temperature sensor 9). In this manner, it is possible to carry out sampling of the pyrolysis gas before and after the plasma cracking processing operation, thereby allowing rapid modification of the parameters of the plasma torch (energy consumption, flow, gas composition, etc.) so as to adapt the system dynamically to the requirements for gas plasma processing.

In an aspect, the technology proposed is further used in the processing of wood waste. In fact, it has to be observed that the pyrolysis of the wood waste generates high quantities of tarry substances (powdered carbon) while the resulting pyrolysis gas after the cracking from toxic gases can be used for energy purposes without any additional purification from the tarry substances.

If the wood contains a sufficient level of humidity between 40 and 60%, the surface processing thereof starts with the pyrolysis (carbonization) and the resultant release of volatile compounds. In a state subjected to plasma cracking, the compounds contained in the pyrolysis gas become decomposed by conversion reactions in the volume of the plasma discharge. These compounds produce a high quantity of an admixture of hydrogen gas while the components of the wood are stratified in an aqueous solution of organic compounds (acids, carbohydrates, phenols, etc.) and in an oily combustible liquid. The heat content of the oily liquid reaches 24×103 KJ/kg which significantly exceeds the heat of combustion of the wood (14×103 KJ/kg). It will be appreciated that, if the processing process continues further, these components readily change into the gaseous state, with a subsequent conversion and production of practically pure carbon monoxide and hydrogen.

The invention thereby solves the problem proposed, achieving a number of advantages including:

compactness and low weight as a result of the high specific power, high efficiency of pyrolytic plasma conversion, minimal cost, rapid response time in the order of fractions of a second, compatibility with a wide range of fuels, including heavy or crude hydrocarbons and "dirty" hydrocarbons with a high content of sulfur, generation of plasma at different pressure ranges and in a stable manner, high quality of cracking over substantially 100% of the gas, cracking of the powdered carbon, thereby eliminating the need for any filters for the powdered carbon.

The invention claimed is:

1. A plasma processing method for a gas, the method comprising:

supplying a gas inside a cavity for plasma processing, supplying microwaves having a predetermined frequency and power in order to generate a plasma of the gas, propagating the microwaves in the gas by means of a waveguide which communicates directly with the cavity so as to provide a plasma cracking processing operation for the gas inside the cavity, the internal volume with respect to the cavity and the waveguide not having any discontinuities, receiving the gas and the microwaves from the waveguide in a processing pipe of the cavity, conveying the gas and the microwaves inside an electromagnetic resonator which is arranged along the processing pipe, the electromagnetic resonator being in the form of a widening of the processing pipe and concentrating the microwaves so as to generate a plasma of the gas inside the electromagnetic resonator, wherein the electromagnetic resonator is arranged along the processing pipe downstream of the waveguide in relation to a direction of flow of the gas and propagation of the microwaves by the waveguide towards the processing pipe.

2. The method according to claim 1, further comprising receiving the gas and the microwaves in the electromagnetic resonator only after the gas and the microwaves have been discharged from the waveguide.

3. The method according to claim 1, wherein the microwaves propagate from the waveguide to the cavity through the gas without encountering any obstacle.

4. The method according to claim 1, wherein the generation of the plasma inside the cavity is fed by the gas without adding any additional gas being introduced into the cavity intended to sustain the generation of the plasma inside the cavity, and wherein the gas comprises a pyrolysis gas.

5. The method according to claim 1, wherein the plasma cracking is carried out at atmospheric pressure.

6. A plasma-chemical reactor for carrying out the plasma processing method for a gas according to claim 1, the plasma-chemical reactor comprising a plasma processing cavity which is configured to receive the gas inside the cavity, an electromagnetic wave source which is configured to supply microwaves having a predetermined frequency and power in order to generate a plasma of the gas inside the cavity, a waveguide which communicates directly with the cavity, the internal volume with respect to the cavity and the waveguide not having discontinuities, the waveguide being configured to receive the microwaves from the electromagnetic wave source and to propagate the microwaves in a guided manner in the cavity through the gas so as to provide a plasma cracking processing operation for the gas inside the cavity, the cavity comprising an inlet pipe which is configured to convey the gas towards the waveguide and a processing pipe which is configured to receive the gas and the microwaves from the waveguide so as to provide the plasma cracking processing operation for the gas inside the processing pipe and an electromagnetic resonator which is arranged along the processing pipe, the electromagnetic resonator being configured to receive the gas and the microwaves along the processing pipe and to concentrate the microwaves inside the electromagnetic resonator so as to generate a plasma of the gas passing through the electromagnetic resonator, the electromagnetic resonator being in the form of a widening of the processing pipe, wherein the electromagnetic resonator is arranged along the processing pipe downstream of the waveguide in relation to a direction of flow of the gas and propagation of the microwaves by the waveguide towards the processing pipe.

7. The plasma-chemical reactor according to claim 6, wherein the electromagnetic resonator along the processing pipe is spaced apart from the waveguide by a first distance and the processing pipe has a first diameter, the first distance being greater than the first diameter, and being between two and ten times the first diameter.

8. The plasma-chemical reactor according to claim 7, wherein the electromagnetic resonator extends along the longitudinal extent of the processing pipe over a second distance which is less than the first distance, the first distance being between two and ten times the second distance.

9. The plasma-chemical reactor according to claim 6, wherein the waveguide has a hollow linear structure which extends along a first axis, the hollow linear structure of the waveguide having a rectangular cross-section.

10. The plasma-chemical reactor according to claim 6, wherein the waveguide has a hollow linear structure which extends along a first axis and the cavity and/or the inlet pipe and/or the processing pipe have a hollow linear structure which extends along a second axis, the second axis being perpendicular to the first axis.

11. The plasma-chemical reactor according to claim 10, wherein the hollow linear structure of the cavity and/or the inlet pipe and/or the processing pipe having has a circular cross-section.

12. The plasma-chemical reactor according to claim 10, wherein the linear structure of the waveguide extends along the first axis over a first length and along the second axis over a second length, the first length being from three to ten times the second length.

13. The plasma-chemical reactor according to claim 12, wherein the first length is from six to seven times the second length.

14. The plasma-chemical reactor according to claim 12, wherein the cross-section of the waveguide extends in a direction perpendicular to the plane defined by the first axis and the second axis over a third length, the second length being from one to two thirds of the third length.

15. The plasma-chemical reactor according to claim 6, wherein the electromagnetic resonator has a hollow cylindrical structure which extends along the second axis of the processing pipe, the hollow cylindrical structure having a cross-section greater than a cross-section of the processing pipe, and wherein the processing pipe has a first diameter, and the electromagnetic resonator has a second diameter greater than the first diameter.

16. The plasma-chemical reactor according to claim 6, wherein the electromagnetic resonator has a second diameter and extends along the longitudinal extent of the processing pipe over a second distance less than or approximately equal to the second diameter.

17. The plasma-chemical reactor according to claim 6, wherein the electromagnetic resonator does not have moving parts.

18. An installation for pyrolysis and/or gasification of biomass, comprising a pyrolyzer and/or gasifier which is configured to supply a pyrolysis gas which is generated by the pyrolysis and/or gasification of the biomass and furthermore the reactor according to claim 6, wherein the reactor is configured to receive the pyrolysis gas and to provide a plasma cracking processing operation for the pyrolysis gas.

* * * * *